Jan. 20, 1959   J. T. LATIMER   2,869,596
VENEER LATHE
Filed Oct. 18, 1956   2 Sheets-Sheet 1
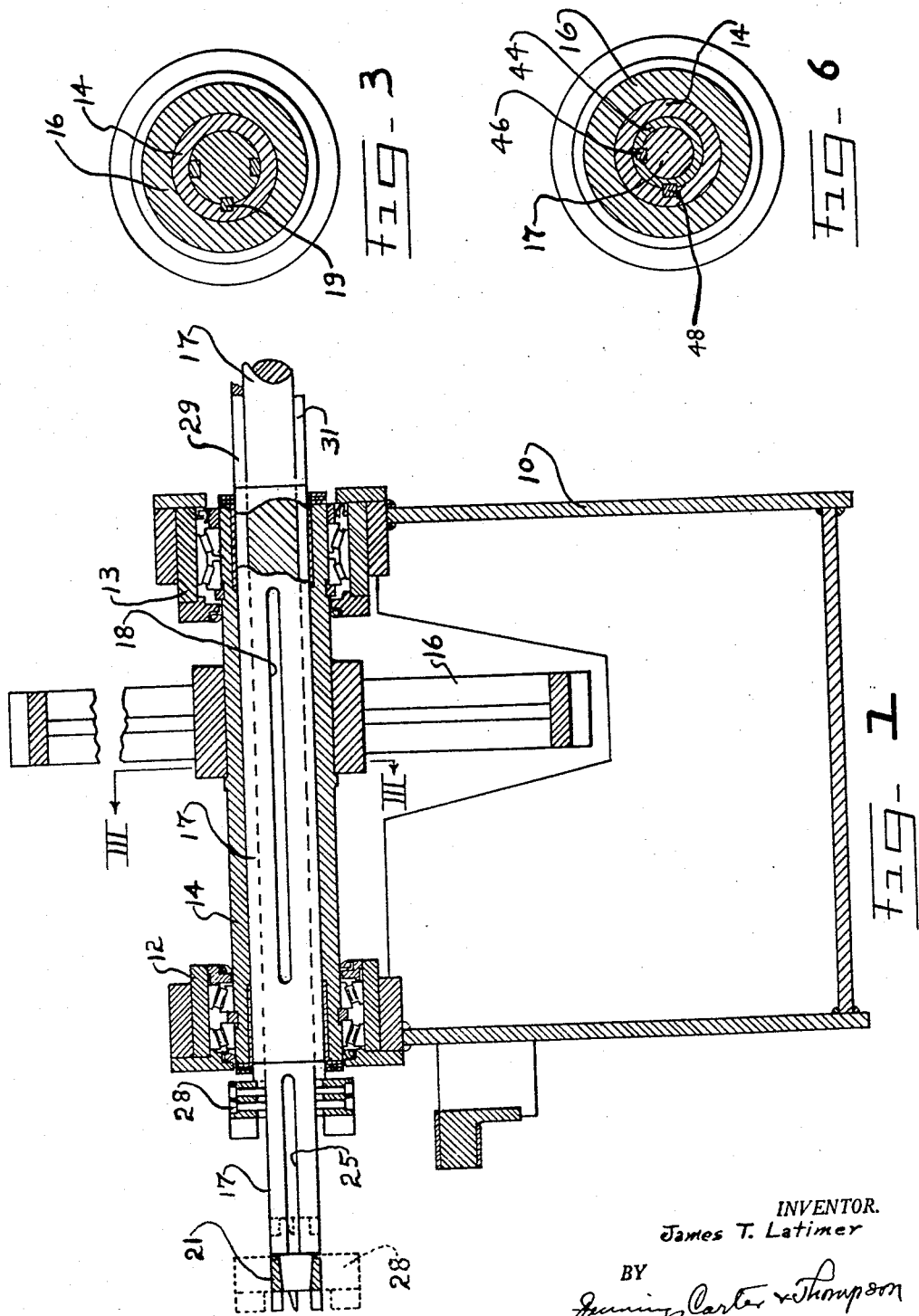
INVENTOR.
James T. Latimer
BY
Jennings Carter & Thompson
Attorneys

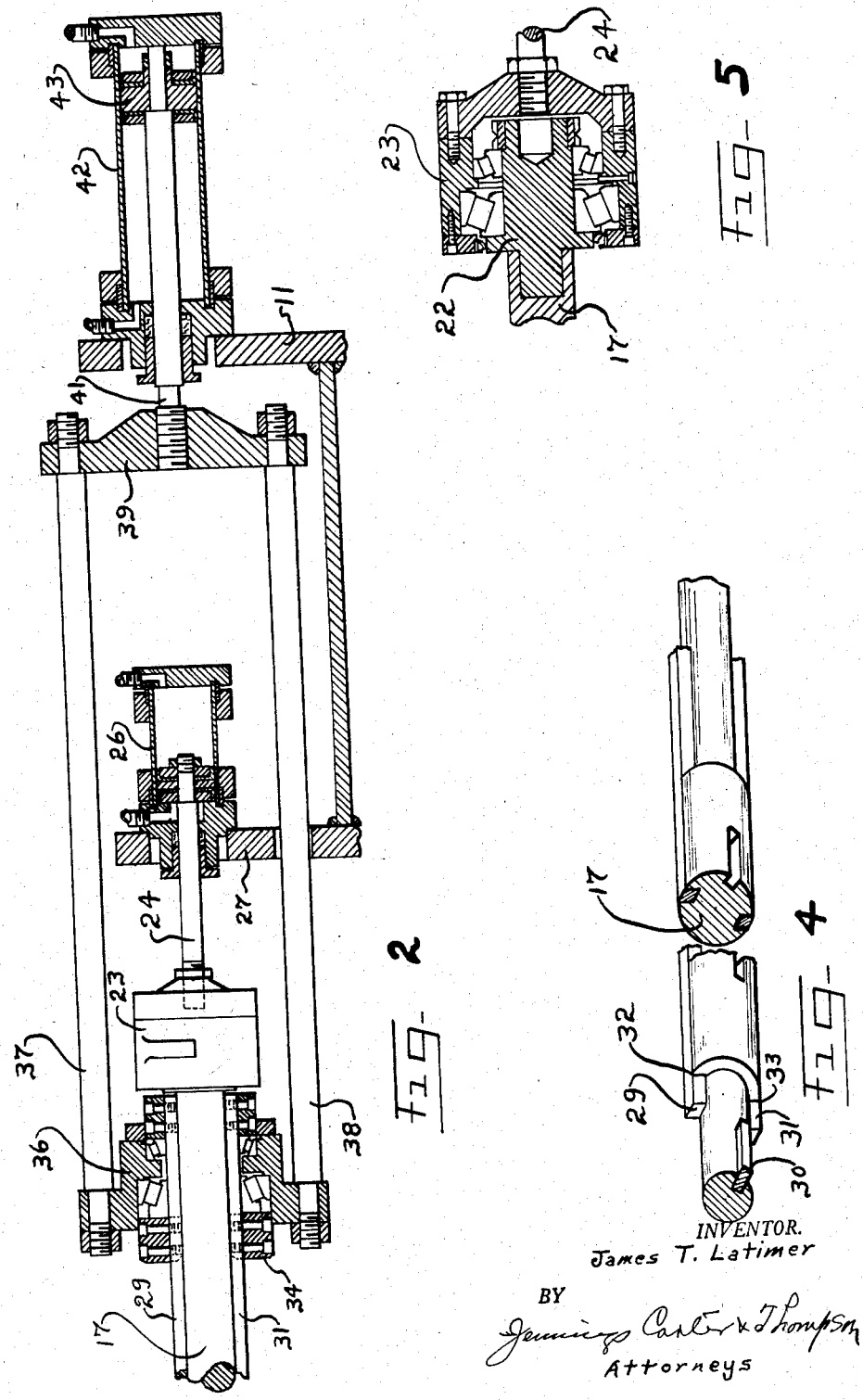

United States Patent Office 2,869,596
Patented Jan. 20, 1959

2,869,596

VENEER LATHE

James T. Latimer, Birmingham, Ala., assignor to Jackson Industries, Inc., a corporation of Alabama Application October 18, 1956, Serial No. 616,696

3 Claims. (Cl. 144—209)

This invention relates to veneer lathes and has for an object the provision, in such a lathe, of improved chucking means whereby to adapt the lathe for more economical operation.

A more specific object of my invention is to provide a double chuck for a veneer lathe embodying a relatively small work engaging chuck and another relatively large chuck surrounding the relative small chuck and movable axially relative thereto, together with means to move, selectively, both chucks axially into and out of work engaging position.

A still further object of my invention is to provide a double chuck for a veneer lathe with a separate hydraulic cylinder for operating each chuck selectively, together with improved transmission and thrust bearing means interposed between each of the hydraulic cylinders and its associated chuck.

Another object of my invention is to provide a veneer lathe which shall be simple and economical of design and manufacture and reliable in operation.

In the operation of veneer lathes it is customary to start with a relatively large diameter log which requires a correspondingly large diameter chuck to hold it in place. As the several cuts are made the diameter of the log decreases until it reaches a point where it equals the diameter of the chuck. In order to obtain all possible cuts from the log it then becomes necessary to stop the machine and mount the core in a smaller diameter chuck.

These and other difficulties are overcome in accordance with my invention in which I provide a lathe having telescoping inner and outer chucks which are mounted for rotation on a rotary spindle and are movable axially of the spindle relative to each other. The chucks are moved in and out of position and are held by means of relatively fixed hydraulic cylinders, with improved thrust bearing assemblies cooperating between the cylinders and the actuating members for the chucks.

Apparatus embodying features of my invention is illustrated in the accompanying drawings, forming a part of this application, in which:

Fig. 1 is a longitudinal section showing one end of a lathe embodying my invention, only such portions being shown as are necessary to illustrate the invention;

Fig. 2 is a section view which is a continuation of Fig. 1 showing the outer end of the lathe and the hydraulic cylinders employed for operating the chucks;

Fig. 3 is a sectional view taken along the line III—III of Fig. 1;

Fig. 4 is a partial isometric view of the chuck spindle with parts shown in section;

Fig. 5 is a sectional view of a thrust bearing assembly employed with my improved lathe; and, Fig. 6 is a sectional view similar to Fig. 3 illustrating a modified form of spindle.

Referring to the drawings, I show frame members 10 and 11 constituting supports for the movable elements to be described later. Mounted in bearings 12 and 13 in the frame member 10 is a rotary quill 14. The quill may be driven by any suitable power means such as the sprocket 16. Mounted inside the quill 14 for rotation therewith is a spindle 17 having an elongated axial groove 18 therein in which fits a spline key 19 connecting the spindle to the quill, whereby the spindle is movable axially of the quill 14. At the outer, or left hand end, of the spindle 17, as viewed in the drawing, is mounted a small work engaging chuck 21 which is adapted to hold in place the core of a log after it has been turned down to a small size.

The other end of the spindle 17 is connected to the inner race portion 22 of a thrust bearing assembly, a well known form of which is illustrated in Fig. 5 of the drawing. The other half, or outer race portion 23, of the thrust bearing assembly is connected to the piston rod 24 of a double acting hydraulic cylinder 26, which latter is fixedly mounted in a stationary portion 27 of the frame. As shown in the drawing, the relatively small chuck 21 is in its outermost or work engaging position. It will be seen that by admitting hydraulic pressure into the left hand end of the cylinder 26, as viewed in the drawing, that the piston will move to the right and withdraw the chuck 21 from its work engaging position.

Surrounding the spindle 17 is a relatively large work engaging chuck 28 which is mounted for rotation on the spindle 17 by a spline connection including an elongated axial groove 25 with a spline key 30 therein. See Fig. 4. Connected to the chuck 28 are two push-pull rods 29 and 31 which fit slidably in grooves 32 and 33, respectively, in the spindle 17.

The other end of the rods 29 and 31 is secured to the inner race 34 of a thrust bearing assembly through which the spindle 17 passes and which is freely movable axially therein. The outer race 36 of the thrust bearing assembly has connected thereto two push-pull rods 37 and 38 which extend axially beyond the thrust bearing assembly 22—23 and the hydraulic cylinder 26 to be connected to a transverse yoke 39. The yoke 39, in turn, is connected to the piston rod 41 of a second double acting hydraulic cylinder 42.

It will be seen by reference to Figs. 1 and 2 of the drawing that the piston 43 of the double acting hydraulic cylinder 42 is in its extreme right hand position as viewed in the drawing and that the relatively large chuck 28 is withdrawn from its work engaging position. It will also be seen that if hydraulic fluid is admitted into the right hand end of the cylinder 42, in the manner well understood, the piston 43 will move to the left, moving with it yoke 39, push rods 37 and 38, the thrust bearing assembly 34—36, push rods 29 and 31, and the relatively large chuck 28 to its work engaging position. In this movement, the thrust bearing assembly 34—36 moves freely on the spindle 17.

Instead of the push-pull rods 29—31, I may employ a hollow spindle 44, as shown in Fig. 6, which is keyed to the spindle 17 by means of a spline key 46 so as to permit relative axial movement between the two spindles. The hollow spindle 44 is, in turn, keyed to the quill 14 by means of a spline key 48 which permits relative longitudinal movement between the two parts. In such event, the hollow spindle 44 would be connected to the inner race 34 of the thrust bearing assembly 34—36 in the same manner as the push-pull rods 29—31 are connected to the inner race 34, and the hollow spindle 44 would also be connected to the relatively large chuck 28 in the same manner as the push-pull rods 29—31.

From the foregoing, the operation of my invention will be readily understood. When a log is first placed in the lathe, both the inner, smaller chuck 21 and the larger chuck 28 will be forced into engagement with the end of the log by their respective hydraulic cylinders. As successive cuts are made on the log its diameter decreases until it reaches that of the relatively large chuck 28, whereupon hydraulic fluid is admitted into the left hand end of the cylinder 42 and exhausted from the right hand end of the cylinder 42 in the well known manner so that the piston 43 moves to the right to its position shown in Fig. 2 of the drawing and the relatively large chuck 28 is moved to the right in its position shown in Fig. 1 of the drawing. The turning of the log continues with the relatively small chuck 21.

It will thus be seen that I have provided an improved veneer lathe having two telescoping chucks, the smaller of which is adapted to engage and hold the core of the log, and the larger to engage and hold a large diameter log when it is first placed in the lathe. It will also be seen that I have an improved, simple economical means for operating the chucks.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In a veneer lathe, a relatively small work engaging chuck, a rotary axially movable spindle for said chuck, a relatively larger work engaging chuck mounted for rotation with said spindle and movable longitudinally thereof, means to rotate both of said chucks in unison, a thrust bearing assembly connected on one side to the spindle and movable axially therewith, a relatively fixed hydraulic cylinder having a piston rod in axial alignment with the spindle and connected to the other side of the thrust bearing assembly, whereby to move the relatively small work engaging chuck into and out of the work engaging position, a second relatively fixed hydraulic cylinder in axial alignment with said first mentioned hydraulic cylinder and having a piston rod in axial alignment with the relatively larger work engaging chuck, and connecting means including a second thrust bearing assembly between said last mentioned piston rod and said relatively larger work engaging chuck to move said chuck into and out of work engaging position, said spindle passing through said second thrust bearing and being freely slidable therein.

2. In a veneer lathe, a frame, a quill mounted for rotation in said frame, power means for actuating the quill, a spindle mounted in said quill for rotation therewith and movable axially relative to said quill, a relatively small work engaging chuck on one end of the spindle, a hydraulic cylinder mounted on said frame and operatively connected to the other end of the spindle to move said chuck into and out of work engaging position through axial movement of said spindle, a relatively large work engaging chuck mounted for rotation on said spindle and movable axially relative thereto, a second hydraulic cylinder mounted on said frame in axial alignment with said first mentioned hydraulic cylinder and operatively connected to said relatively large chuck to move it axially into and out of work engaging position, and a thrust bearing assembly in the connection between said second hydraulic cylinder and said relatively large chuck through which the spindle passes and through which it is freely slidable.

3. Apparatus as set forth in claim 2 in which the relatively large chuck is operatively connected to its associated hydraulic cylinder by means of push rods joined to said chuck which pass through axial grooves formed in the spindle and in which a thrust bearing is interposed between the spindle and its associated hydraulic cylinder.

References Cited in the file of this patent

UNITED STATES PATENTS

| | | |
|---|---|---|
| 162,913 | Granger | May 4, 1875 |
| 2,501,387 | Haumann | Mar. 21, 1950 |
| 2,612,071 | Kurzweil | Sept. 30, 1952 |

FOREIGN PATENTS

| | | |
|---|---|---|
| 627,450 | Great Britain | Aug. 9, 1949 |
| 919,526 | France | Mar. 11, 1947 |